United States Patent [19]

Dubost

[11] Patent Number: 5,249,845
[45] Date of Patent: Oct. 5, 1993

[54] WHEEL COVER, IN PARTICULAR FOR AN AUTOMOBILE VEHICLE

[75] Inventor: Dominique Dubost, La Celle Saint Cloud, France

[73] Assignee: Attax, Chatou, France

[21] Appl. No.: 827,426

[22] Filed: Jan. 29, 1992

[30] Foreign Application Priority Data

Jan. 29, 1991 [FR] France .................. 91 00970

[51] Int. Cl.$^5$ .................................. B60B 7/06
[52] U.S. Cl. ............................ 301/37.37; 301/108.4
[58] Field of Search ............... 301/37.1, 37.37, 37.42, 301/37.35, 37.36, 108.1, 108.4

[56] References Cited

U.S. PATENT DOCUMENTS

| | | | |
|---|---|---|---|
| 2,737,406 | 3/1956 | Brookbank | 292/65 |
| 4,382,635 | 5/1983 | Brown et al. | 301/37 S X |
| 4,707,035 | 11/1987 | Kondo et al. | 301/37 P |
| 4,962,968 | 10/1990 | Caplin | 301/37 S X |
| 4,998,780 | 3/1991 | Eshler et al. | 301/37 X |
| 5,022,710 | 6/1991 | Groppo | 301/37 S |
| 5,071,197 | 12/1991 | Webster et al. | 301/37 S |

FOREIGN PATENT DOCUMENTS

| | | | |
|---|---|---|---|
| 570222 | 4/1924 | France . | |
| 0102702 | 8/1980 | Japan | 301/37 S |

*Primary Examiner*—Russell D. Stormer
*Attorney, Agent, or Firm*—Sughrue, Mion, Zinn, Macpeak & Seas

[57] ABSTRACT

The embellishing member wheel cover, provided with hooking or attachment members (4) for hooking or attachment onto the head or lug nut (5) of a bolt (5b) that functions as a fixing or fastening element that fixes the wheel on a hub of the vehicle, is characterized in that each hooking member comprises a first sleeve (8) connected to the wheel cover (1) and in which is axially movable a second sleeve (9) coaxial with the first sleeve (8) and provided with an abutment surface (11) and elastically deformable branches (12, 13), at the end of each of which is provided a hooking portion (12a, 13a) extending inwardly of the first sleeve, the second sleeve being movable in the first sleeve, by a bearing of the head of the respective fixing element (5) on the abutment surface (11), between a mounting position of the wheel cover relative to the wheel, in which the branches (12, 13) of the first sleeve extend around the head of the fixing element, inside the first sleeve and the hooking portions (12a, 13a) of the branches cooperate with an abutment surface (5a) on the fixing element (5) for hooking the wheel cover to the wheel, and retractable members (14, 15, 14a, 15a, 9a, 9b, 9c, 9d) are provided for locking the second sleeve (9) relative to the first sleeve (8) in the mounting and dismounting or hooking positions.

4 Claims, 1 Drawing Sheet

WHEEL COVER, IN PARTICULAR FOR AN AUTOMOBILE VEHICLE

BACKGROUND OF THE INVENTION

The present invention relates to a wheel cover or disc, in particular for an automobile vehicle.

Automobile vehicle wheel covers are known in the art which comprise a front side and a rear side which is provided with means for hooking or attaching to fixing or fastening elements that fix the wheel to a hub of the vehicle.

These hooking or attaching means are generally formed by hooking studs provided with elastically deformable branches at the end of each of which is provided a hooking portion extending inwardly of the stud and adapted to cooperate, with an abutment surface of the element that fix the wheel to the hub, so as to hook or attach the wheel cover to the wheel.

When placing in position or withdrawing the wheel cover, the branches of each hooking stud elastically deform and pass over the head of the fixing (a bolt or nut) element.

However, these wheel covers have a number of drawbacks in that their hooking to the wheel is hardly reliable and their mounting and dismounting are relatively difficult.

SUMMARY OF THE INVENTION

An object of the invention is therefore to overcome these problems by providing a wheel cover which may be very easily mounted and dismounted and is very reliably hooked or attached to the wheel.

The invention therefore provides a wheel cover, in particular for an automobile vehicle, of the type comprising a front side and a rear side which, is provided with means for hooking or attaching to elements (e.g., bolts or nuts) that fix the wheel to a hub of the vehicle, characterized in that each hooking or attaching means comprises a first sleeve which is connected to the rear side of the wheel cover and in which is axially movably mounted a second sleeve coaxial with the first sleeve and including an end portion provided with an abutment surface and elastically deformable branches, at the end of each of which branches is provided a hooking portion extending inwardly of the sleeve, the second sleeve being movable in the first sleeve, by the bearing of the head of the fixing element on the abutment surface, between a mounting and dismounting position of the wheel cover relative to the wheel, in which position the branches of the second sleeve extend out of the first sleeve, and a hooking position in which hooking position the branches of the second sleeve extend around the head of the fixing element, inside the first sleeve, and the hooking portions of the branches cooperate with an abutment surface on the head of the fixing element so as to hook or attach the wheel cover to the wheel, and flexible retractable means are provided for locking the second sleeve with respect to the first sleeve in the mounting and dismounting or hooking positions.

Advantageously, the locking means comprise portions extending inwardly of the first sleeve at the end of branches of the first sleeve and adapted to engage in corresponding recesses provided in proximity to ends of the second sleeve.

Again advantageously, the hooking portions of the end of the branches of the second sleeve include inclined surfaces facilitating the mounting or dismounting of the wheel cover and cooperating with a frustoconical abutment surface on the fixing element (lug nut), when the head of said fixing element bears against the abutment surface of the second sleeve, so as to hook or attach under stress the wheel cover to the fixing element.

A better understanding of the invention will be had from the following description which is given solely by way of example with reference to the accompanying drawings in which:

DESCRIPTION OF A PREFERRED EMBODIMENT

Figure 1:
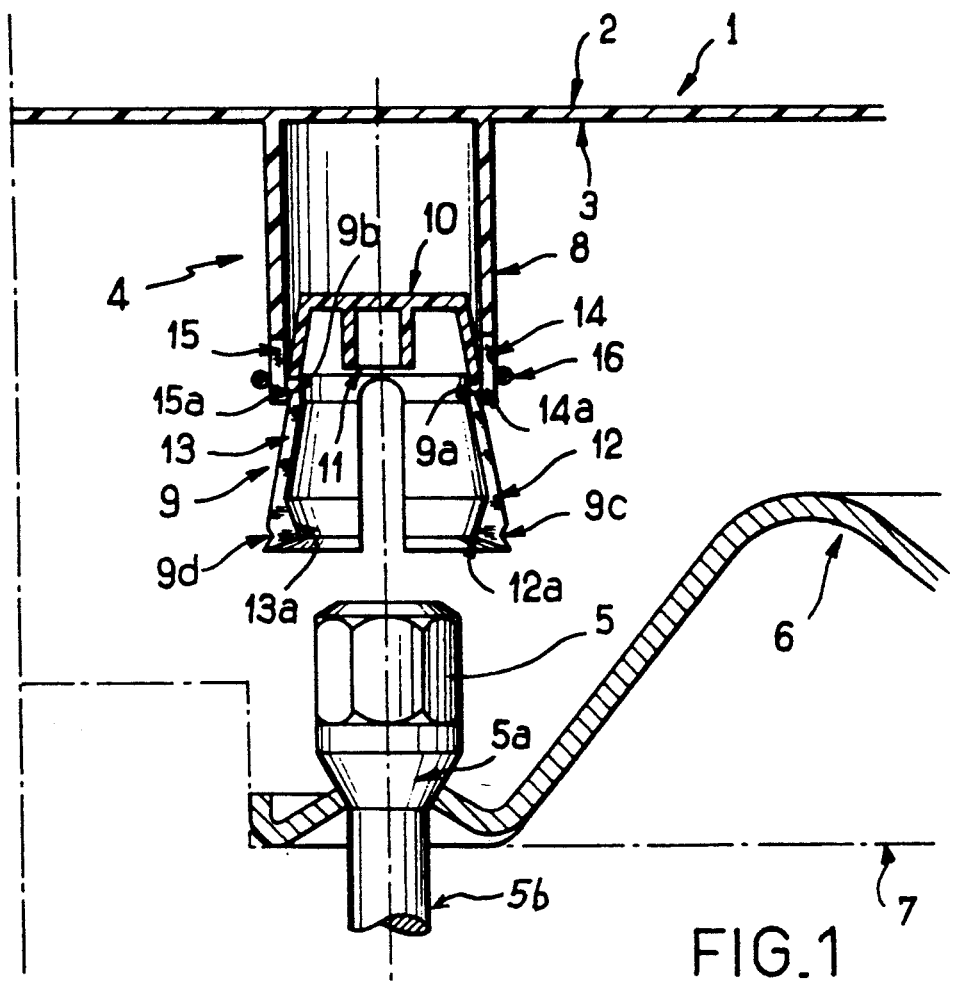
FIGS. 1 and 2 are sectional views of a wheel cover or disc according to the invention, respectively in the mounting position and in the hooking position on the wheel.

As can be seen in these FIGURES, a wheel COVER or disc, in particular for an automobile vehicle, generally designated by the reference character 1, comprises a front side 2 and a rear side 3.

The rear side of this wheel cover is provided with hooking or attachment means 4 for hooking or attaching the wheel cover 1 onto fixing elements which fix the wheel 6 to a hub of the vehicle, generally designated by the reference character 7. These fixing elements may be the illustrated at least partially threaded conventional wheel bolts 5b, each of which has an enlarged integral head or cap portion 5 that is called a "lug" or "lug nut". Each of these conventional threaded bolts 5b cooperates with threaded bores in the hub in order to fix a wheel 6 to the hub. Alternatively, these fixing elements may be conventional threaded wheel nuts which cooperate with threaded studs fixed to the hub in order to fix the wheel to the hub. For the purpose of this application, the generic term "head" is used to designate that portion of the fixing element (a wheel bolt 5b or a nut) which the hooking or attachment means 4 is hooked or attached for securing the wheel cover 1 to the fixing element.

According to the invention, each hooking or attachment means comprises a first sleeve 8 which is connected to the rear side of the wheel cover and in which is axially movably mounted a second sleeve 9 coaxial with the first sleeve.

The second sleeve 9 comprises an end portion 10 provided with an abutment surface 11, which for example projects from this bottom portion, and elastically deformable branches, for example 12 and 13, at the end of each of which is provided a hooking or attaching portion respectively 12a and 13a extending inwardly of the second sleeve 9.

Figure 2:
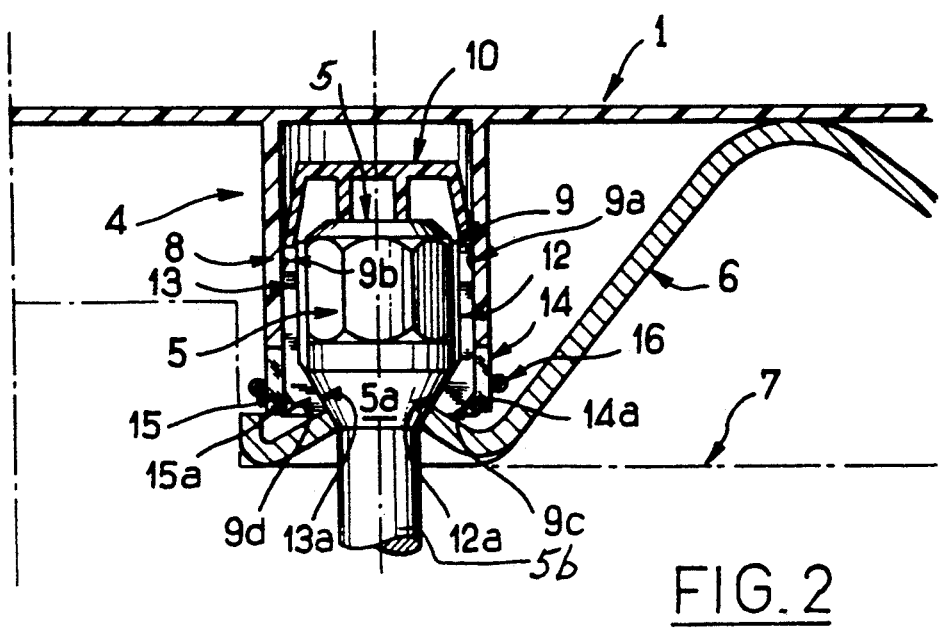

As can be seen in the drawings, the second sleeve 9 is mounted to be movable relative to the first sleeve 8 between a mounting or dismounting position of the wheel cover relative to the wheel, shown in FIG. 1, in which the branches 12, 13 of the second sleeve extend out of the first sleeve to permit the passage of the head 5 of the fixing element (bolt 5b) between the branches, and a hooking or attaching position of the wheel cover on the wheel, shown in FIG. 2, in which the branches 12 and 13 of the second sleeve 9 extend around the head 5, of the bolt 5b, inside the first sleeve and the hooking or attaching portions 12a and 13a of the branches 12 and 13 of the second sleeve cooperate with an abutment surface 5a on the lug nuts for hooking the wheel cover to the wheel.

It will be observed from FIG. 1 that, in the mounting or dismounting position, the second sleeve 9 has a generally divergent shape and is open toward the bolt 5b and permits an easy engagement of the second sleeve 9 around the head 5 of the bolt when placing the wheel cover in position.

When the second sleeve 9 has been engaged around the head 5 of the bolt 5, the head 5 bears against the abutment surface 11 provided on the end portion 10 of the second sleeve 9, so that if the user pursues his action on the wheel member for hooking or attaching it to the wheel, the second sleeve 9 moves axially inside the first sleeve 8. This causes the branches 12 and 13 of the second sleeve to move toward each other, resulting in the engagement of the hooking portions 12a and 13a of these branches against the abutment surface 5a of the lug nut.

Note that this abutment surface 5a of the bolt head 5 may have a frustoconical shape and the hooking portions 12a and 13a at the end of the branches 12 and 13 of the second sleeve 9 may have inclined surfaces facilitating the mounting or dismounting of the wheel cover and cooperative with the frustoconical abutment surface 5a of the bolt head 5 for, when the head 5 bears against the abutment surface on the end portion of the second sleeve, hooking or attaching wheel cover to the wheel under stress.

Indeed, this structure permits creating a fixing stress between the head 5, the abutment surface 11 on the end portion 10 of the sleeve 9 and the hooking portions 12a and 13a bearing against the frustoconical abutment surface 5a of the bolt head 5b.

Note furthermore that retractable means are provided for locking the second sleeve 9 relative to the first sleeve 8 in the mounting and dismounting or hooking positions. These retractable means are formed by the branches 14 and 15 of the first sleeve 8.

Indeed, to provide such retractable means, the first sleeve 8 includes branches 14 and 15 at the end of each of which is provided a portion 14a and 15a extending inwardly of the first sleeve, these inwardly extending portions being adapted to cooperate with recesses 9a, 9b, 9c and 9d in the second sleeve provided in proximity to each end of the latter.

Thus, in the mounting and dismounting position of the wheel cover shown in FIG. 1, the bent portions 14a and 15 a of the branches 14 and 15 of the first sleeve 8 retractables engage in the recesses 9a and 9b provided at one of the ends of the second sleeve, whereas, in the hooking or attaching position, these inwardly extending portions have been retracted from recesses 9a and 9b and now engage in the recesses 9c and 9d provided at the other end of the second sleeve.

It will therefore be understood that, in the mounting or dismounting position (FIG. 1), the second sleeve 9 is maintained relative to the first sleeve 8 in the open position to facilitate the passage of the second sleeve 9 around the head 5 of the 5b until this head 5 comes to bear against the abutment surface 11 on the end portion of the second sleeve.

When pursuing the displacement of the wheel cover, this head 5 causes an axial displacement of the second sleeve 9 inside the first sleeve 8 so that the elastic branches 12 and 13 of the second sleeve move toward each other and the bent portions 12a and 13a of the branches come to bear against the abutment surface 5a of the head 5 of the bolt 5b, the inwardly extending portions 14a and 15a of the branches 14 and 15 of the first sleeve 8 engaging in the recesses 9c and 9d of the other end of the second sleeve so as to lock the second sleeve in position inside the first sleeve and therefore maintain the wheel cover in position relative to the wheel of the vehicle.

Note, moreover, that an elastically yieldable ring 16 may be provided around the branches 14 and 15 of the first sleeve 8 so as to increase the force maintaining the second sleeve inside the first sleeve.

It will be understood that these means for locking the second sleeve in the first sleeve associated with the bent hooking portions 12a and 13a of the branches 12 and 13 of the second sleeve permit placing the second sleeve under stress between these bent portions and the abutment surface of the end portion of the second sleeve so as to ensure maintaining without play the wheel cover in position on the heads 5 of the fixing element and therefore with respect to the wheel.

The various component parts and hooking means just described may be for example made from a plastics or other material.

What is claimed is:

1. Wheel cover, in particular for a wheel of an automobile vehicle, said wheel cover comprising:
   a front side and a rear side; and
   attachment means provided on said rear side for attaching to fixing elements that fix said wheel on a hub of said vehicle, each of said fixing elements having a head with a first abutment surface;
   each attachment means comprising:
   a first sleeve connected to said rear side of said wheel cover; and
   a second sleeve coaxial with said first sleeve and axially movable in said fist sleeve;
   said second sleeve comprising:
   an end portion;
   a second abutment surface on said end portion; and
   elastically deformable branches;
   an attaching portion extending inwardly of said second sleeve, being provided on each branch adjacent to an end of said branch;
   said second sleeve being movable in said first sleeve, by engagement of said head of said fixing element with said second abutment surface, between (1) a mounting and dismounting position of said wheel cover relative to said wheel, in which position said branches of said second sleeve extend out of said first sleeve, and (2) an attachment position in which (1) said branches of said second sleeve extend around said head of a respective fixing element inside said first sleeve and (2) each of said attaching portions of said branches cooperates with said first abutment surface of said head of said respective fixing element for attaching said wheel cover to said wheel;
   retractable means being provided for locking said second sleeve relative to said first sleeve in said mounting and dismounting or attaching positions.

2. Wheel cover according to claim 1, wherein said retractable means comprise branches on said first sleeve and a portion extending inwardly of said first sleeve at the end of each of said branches of said first sleeve, said portions of said branches of said first sleeve being engageable in corresponding recesses provided adjacent to ends of said second sleeve.

3. Wheel cover according to claim 1, wherein said first abutment surface on said head of each fixing element is frustoconical, and wherein said attaching portions at the end of said branches of said second sleeve include inclined surfaces which facilitate the mounting and the dismounting of said wheel member and which cooperate with said frustoconical first abutment surface when said head engages against said second abutment surface of said second sleeve, thereby attaching under stress said wheel cover to said head of said fixing element.

4. Wheel cover according to claim 1, wherein in said mounting and dismounting position, said second sleeve has an open generally divergent shape in a direction toward said head of said fixing element.

* * * * *